United States Patent
Hong

(10) Patent No.: US 12,414,137 B2
(45) Date of Patent: Sep. 9, 2025

(54) METHOD AND DEVICE FOR RECEIVING MBS DATA

(71) Applicant: KT CORPORATION, Gyeonggi-do (KR)

(72) Inventor: Sung-pyo Hong, Gyeonggi-do (KR)

(73) Assignee: KT CORPORATION, Gyeonggi-do (KR)

(*) Notice: Subject to any disclaimer, the term of this patent is extended or adjusted under 35 U.S.C. 154(b) by 767 days.

(21) Appl. No.: 17/717,008

(22) Filed: Apr. 8, 2022

(65) Prior Publication Data
US 2022/0417906 A1  Dec. 29, 2022

(30) Foreign Application Priority Data

Feb. 15, 2021  (KR) .................. 10-2021-0020149
Jan. 21, 2022  (KR) .................. 10-2022-0009222

(51) Int. Cl.
*H04W 72/30* (2023.01)
*H04L 1/1812* (2023.01)
*H04W 72/23* (2023.01)

(52) U.S. Cl.
CPC .......... *H04W 72/30* (2023.01); *H04L 1/1812* (2013.01); *H04W 72/23* (2023.01)

(58) Field of Classification Search
CPC ....... H04W 72/30; H04W 72/23; H04W 4/06; H04W 72/11; H04W 72/231; H04L 1/1812; H04L 2001/0093; H04L 1/1822; H04L 1/1887; H04L 1/1896
See application file for complete search history.

(56) References Cited

U.S. PATENT DOCUMENTS

| | | | | |
|---|---|---|---|---|
| 2018/0270041 | A1* | 9/2018 | Lee | H04L 5/14 |
| 2020/0228931 | A1* | 7/2020 | Määttanen | H04W 72/30 |
| 2022/0360951 | A1* | 11/2022 | Yu | H04W 4/06 |
| 2023/0239660 | A1* | 7/2023 | Kim | H04W 76/10 370/312 |

OTHER PUBLICATIONS

Chengdu TD Tech et al., "Discussion on group scheduling for RRC_CONNECTED UEs", R1-2101579, 3GPP TSG RAN WG1 Meeting#104-e, e-Meeting, Jan. 25-Feb. 5, 2021, pp. 1-8.
Moderator (CMCC), "Summary#10 on mechanisms to support group scheduling for RRC_CONNECTED UEs for NR MBS", R1-2102171, 3GPP TSG RAN WG1 #104-e, e-Meeting, Jan. 25-Feb. 5, 2021, pp. 1-192.

* cited by examiner

*Primary Examiner* — Julio R Perez
(74) *Attorney, Agent, or Firm* — IP Legal Services, LLC

(57) ABSTRACT

Provided are a method and device for processing multicast/broadcast service (MBS) data by a UE in an NR-based mobile communication network. The method may include receiving configuration information for receiving MBS data through semi-persistent scheduling (SPS), monitoring indication information associated with the SPS based on the configuration information, and receiving the MBS data according to the SPS based on the configuration information.

19 Claims, 12 Drawing Sheets

METHOD AND DEVICE FOR RECEIVING MBS DATA

CROSS-REFERENCE TO RELATED APPLICATION

This application claims priority from Korean Patent Application Nos. 10-2021-0020149, filed on Feb. 15, 2021, and 10-2022-0009222, filed on Jan. 21, 2022, which are hereby incorporated by reference for all purposes as if fully set forth herein.

BACKGROUND

Field

The disclosure relates to a method and a device for a user equipment (UE) to process multicast/broadcast service (MBS) data in an NR-based mobile communication network.

Description of Related Art

Cellular mobile communication networks have been mainly developed to provide end-to-end/point-to-point transmission services, but the development of broadband wireless transmission technologies and terminals that provide various functions are leading to demand for various services. In particular, multimedia broadcast multicast services (MBMS) may provide mobile broadcasting services using a cellular mobile communication network. Recently, various techniques are being developed to provide disaster relief communication services using enhanced MBMS (hereinafter, "eMBMS").

Unlike the end-to-end transmission service, MBMS is an end-to-many/point-to-multipoint transmission service and may advantageously increase the efficiency of use of radio resources by transmitting the same packet to multiple terminals within a single cell. Further, the MBMS service adopts a multi-cell transmission scheme in which a plurality of base stations simultaneously transmit the same packet, and use of such multi-cell transmission scheme allows the terminal receiving the service to obtain a diversity gain in the physical layer.

However, when the base station transmits MBMS service data, the efficiency may vary depending on the number of UEs receiving the corresponding data. Therefore, there is required a method and a device for controlling MBS data based on NR and providing MBS even in various UE RRC states.

Also, there is required a method and a device for providing MBS through semi-static scheduling.

BRIEF SUMMARY

The disclosure provides a method and a device for a UE to efficiently process MBS data.

In accordance with an embodiment, a method may be provided for receiving multicast/broadcast service (MBS) data by a UE. The method may include receiving configuration information for receiving MBS data through semi-persistent scheduling (SPS), monitoring indication information associated with the SPS based on the configuration information, and receiving the MBS data according to the SPS based on the configuration information.

In accordance with another embodiment, a method may be provided for transmitting multicast/broadcast service (MBS) data by a base station. The method may include configuring configuration information for transmitting MBS data to a UE through SPS, transmitting the configuration information to the UE through higher layer signaling, and transmitting the MBS data according to the SPS based on the configuration information.

In accordance with still another embodiment, a UE may be provided for receiving multicast/broadcast service (MBS) data. The UE may include a receiver receiving configuration information for receiving MBS data through semi-persistent scheduling (SPS) and a controller monitoring indication information associated with the SPS based on the configuration information. The receiver receives the MBS data according to the SPS based on the configuration information.

In accordance with yet another embodiment, a base station may be provided for transmitting multicast/broadcast service (MBS) data. The base station may include a controller configuring configuration information for transmitting MBS data to a UE through SPS and a transmitter transmitting the configuration information to the UE through higher layer signaling and transmitting the MBS data according to the SPS based on the configuration information.

According to the embodiments, a UE may efficiently process MBS data.

DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
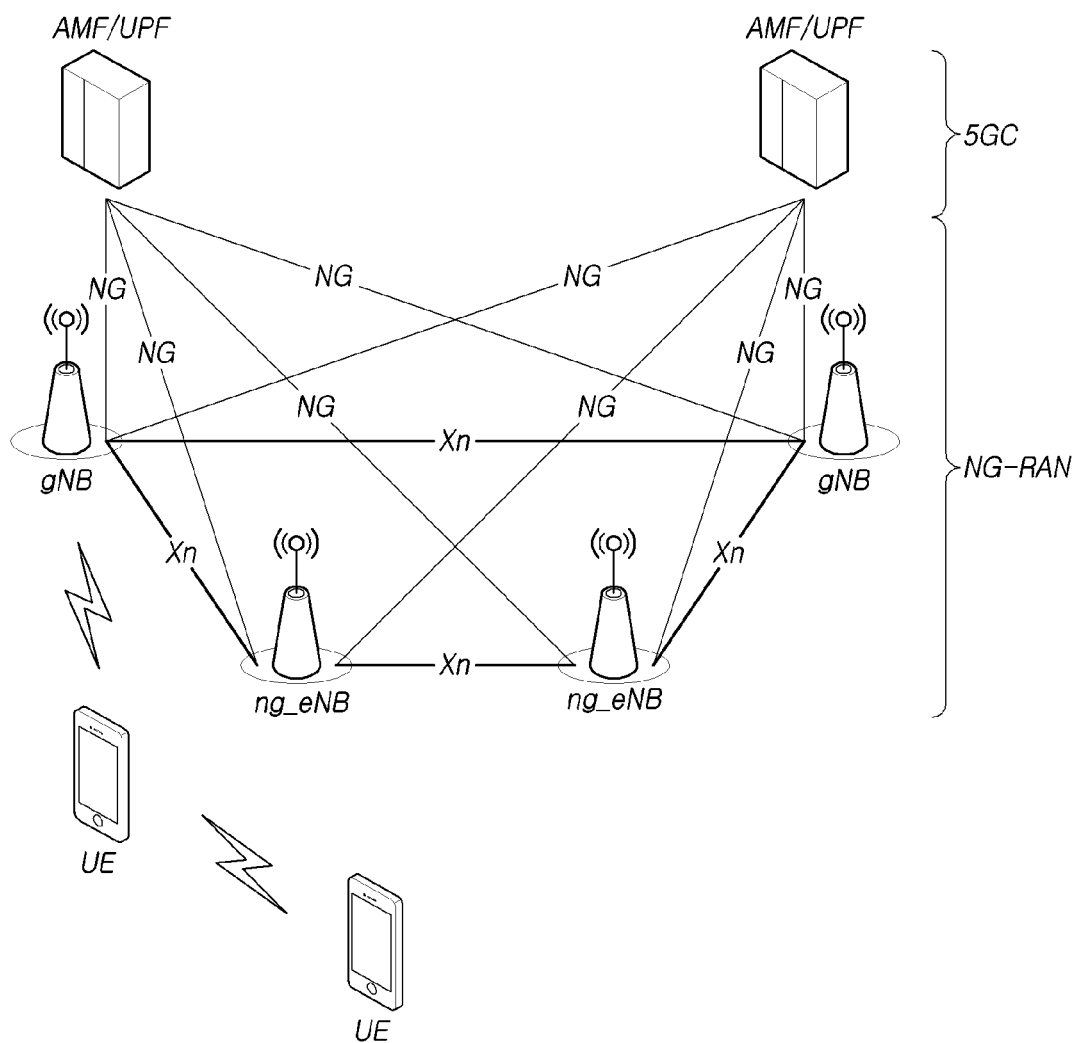
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
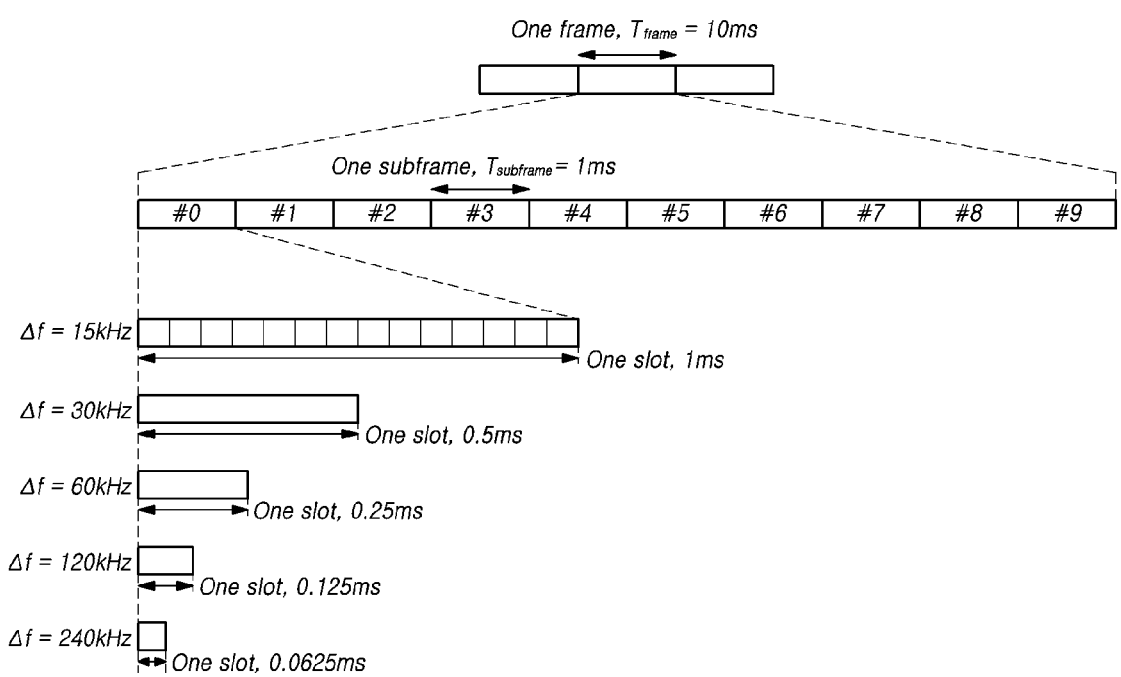
FIG. 2 is a view schematically illustrating a frame structure in an NR system in accordance with embodiments of the present disclosure.

FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
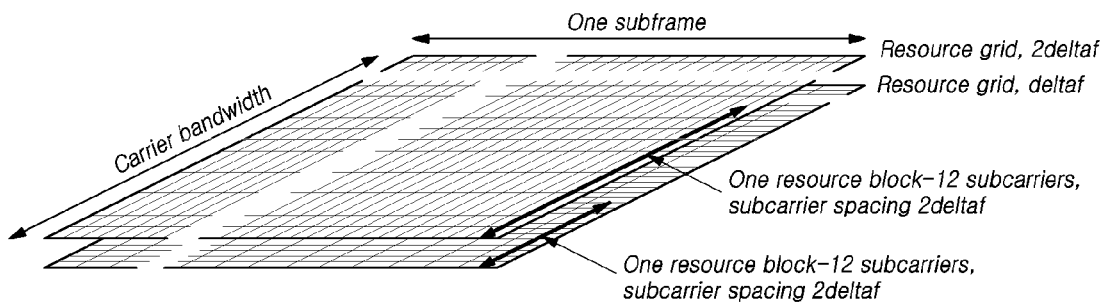
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
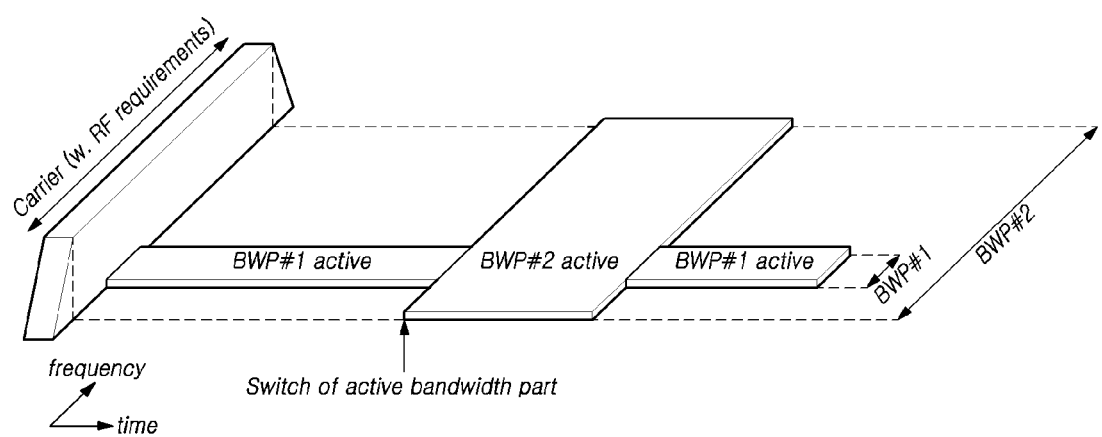
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
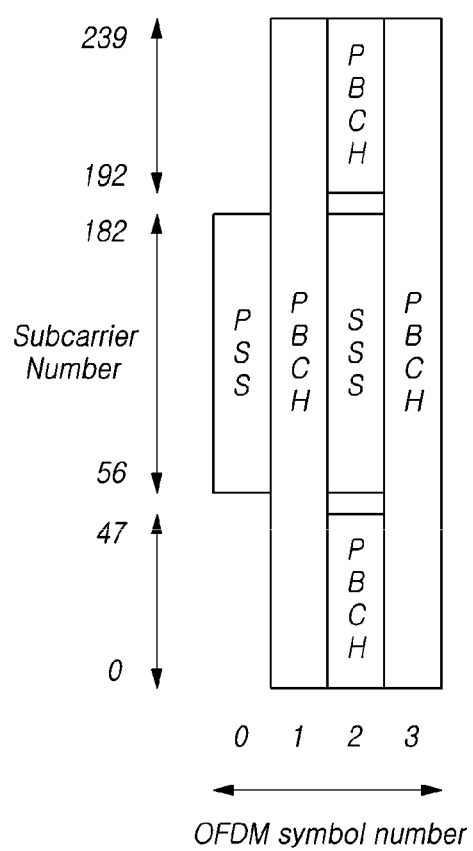
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
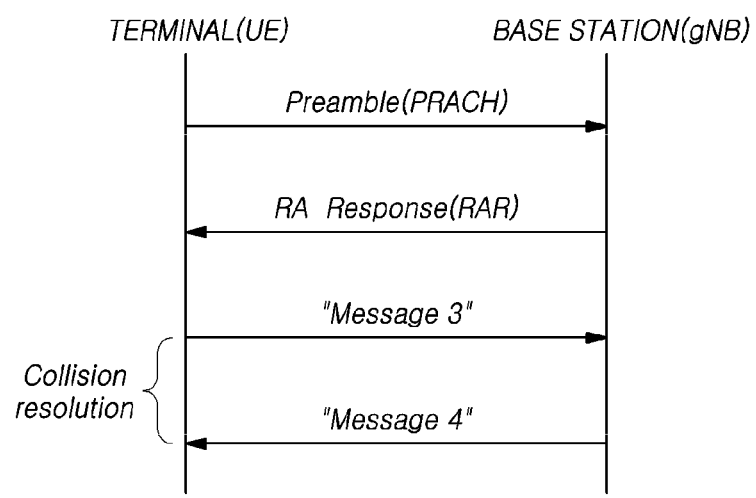
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
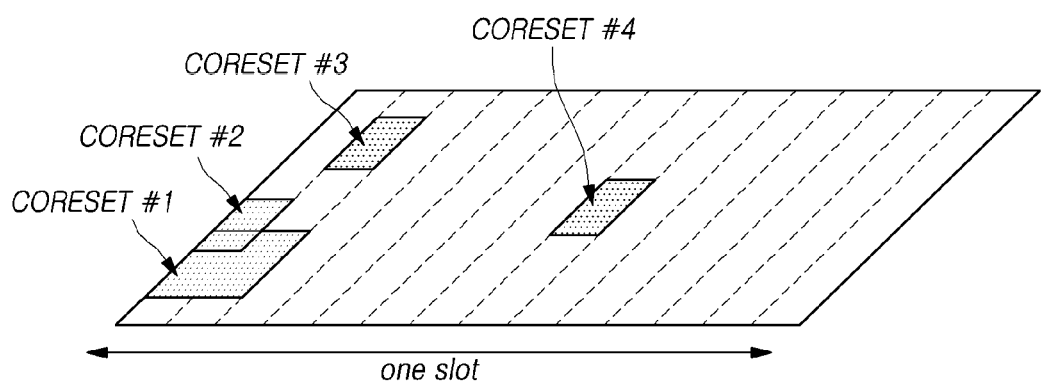
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

The present disclosure relates to an MBS transmission/reception method and device for a UE to transmit/receive multicast/broadcast service (MBS) data in an NR-based mobile communication network. In particular, the present disclosure introduces a method and device for transmitting and receiving MBS using semi-persistent scheduling (SPS).

NR(New Radio)

Lately, 3GPP introduced NR, and NR has been designed to meet various QoS requirements required for each of further divided and specified use scenarios as well as an enhanced data rate as compared to LTE. In particular, as representative usage scenarios of NR, enhancement mobile broadband (eMBB), massive MTC (mMTC), and ultra-reliable and low latency communications (URLLC) have been defined. As a method for meeting the requirements for each usage scenario, it is required to design a frame structure to be flexible as compared with LTE. Each use scenario has different requirements for data rates, latency, reliability, coverage, etc. Therefore, as a method to efficiently satisfy the requirements for each usage scenario through the frequency band constituting an NR system, it has been designed to efficiently multiplex radio resource units which are based on different numerologies (e.g., subcarrier spacing, subframe, TTI, etc.).

For example, there has been discussed a method for multiplexing and supporting numerology having different subcarrier spacings based on time division multiplexing (TDM), frequency division multiplexing (FDM), or TDM/FDM through one or more NR component carriers. Also discussion has been made for a scheme to support more than one time units in configuring a scheduling unit in the time domain. In this regard, NR defines subframe as one type of time domain structure. As reference numerology for defining the subframe duration, it has been determined to define a single subframe duration composed of 14 OFDM symbols of normal CP overhead based on 15 kHz sub-carrier spacing (SCS) which is the same as that of LTE. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot which is constituted of a smaller number of symbols than the above-described slot is defined. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, the latency requirements may be hard to meet. Thus, a mini-slot constituted of a smaller number of OFDM symbols than the slot constituted of 14 symbols may be defined and, based thereupon, scheduling capable of meeting the URLLC requirements may be carried out.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

NR MBS (Multicast and Broadcast Services)

3GPP approved a task item for MBS based on 5G/NR in Rel-17. MBS denotes a multicast communication service and a broadcast communication service.

In a broadcast communication service, the same service and the same specific content data may be simultaneously provided to all UEs within one geographic area. All UEs within the broadcast coverage may be able to receive data. A broadcast communication service may be transferred to the UE using a broadcast session. In the case of the broadcast session, the UE may receive MBS data in RRC idle, RRC inactive, and RRC connected states.

In the multicast communication service, the same service and the same specific content data may be simultaneously provided to a designated set of UEs. Not all UEs within multicast coverage are authorized for data reception. A multicast communication service may be transferred to the UE using a multicast session. In the case of the multicast session, the UE may receive MBS data in an RRC connected state.

For the multicast service, the base station may transfer the MBS data packet using the following method.

PTP (Point To Point) transmission: The base station separately transfers separate copies of the MBS data packet. The base station may schedule the UE-specific PDSCH using the UE-specific PDCCH that is CRC-scrambled by the UE-specific RNTI (e.g., C-RNTI). The UE-specific PDSCH is scrambled with the same UE-specific RNTI (e.g., C-RNTI).

PTM (Point To Multipoint) transmission: The base station transfers a single copy of the MBS data packet to a set of UEs. The base station may schedule the group common PDSCH using a group common PDCCH that is CRC-scrambled by a group common RNTI (e.g., G-RNTI of LTE SC-PTM). The group common PDSCH is scrambled with the same group common RNTI.

The base station may dynamically determine whether to transmit multicast data by PTM or PTP for one UE. The base station may dynamically schedule multicast data to be transmitted, and transmit the data to the UE. Dynamic downlink scheduling requires the transmission of downlink control information (DCI). Semi-Persistent Scheduling (SPS) may be used to perform downlink transmission without dynamic scheduling. However, a specific technique is not provided for a method for the base station and the UE to transmit and receive MBS data using the SPS.

In order to overcome the problems, the present disclosure introduces a specific technique between a UE and a base station for transmitting and receiving MBS data using the SPS.

Hereinafter, a method and device for providing an NR radio access technology-based multicast/broadcast service (MBS) will be described. However, this is for convenience of description, and the disclosure may be applied to any radio access technology (e.g., LTE or 6G). The embodiment described in the disclosure may include the content of information elements and operations set forth in TS 38.321, the 3GPP NR MAC standard, and TS 38.331, the NR RRC standard. Although the disclosure does not contain the content of the UE operation related to the detailed definitions for the corresponding information elements, the content set forth in the standards may be incorporated in the disclosure.

For convenience of description, the following description focuses primarily on a method for receiving multicast communication service data by an RRC connected UE. However, this is for convenience of description, and the embodiments may be applied to broadcast communication services as well. Further, the present embodiments may also be applied to RRC idle or RRC inactive UEs.

The embodiments described below may be applied individually or in any combination thereof.

Figure 8:
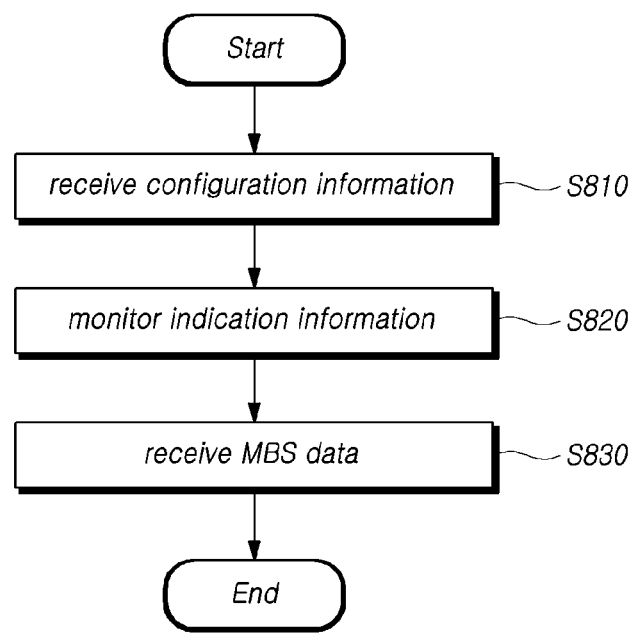
FIG. 8 is a flowchart for describing operations of a UE according to an embodiment.

FIG. 8 is a flowchart for describing operations of a UE according to an embodiment.

Referring to FIG. 8, a UE receiving multicast/broadcast service (MBS) data may perform the step of receiving configuration information to receive multicast/broadcast service (MBS) data through semi-persistent scheduling (SPS) (S810).

For example, the UE may receive configuration information for receiving MBS data transmitted in a broadcast, groupcast or unicast form from the base station. The configuration information may include information necessary for the UE to receive MBS data through semi-persistent scheduling. The configuration information may be received through higher layer signaling. For example, the configuration information may be received by the UE through an radio resource control (RRC) message.

According to an embodiment, the configuration information may include at least one information of an identifier used to indicate whether semi-persistent scheduling is activated for the point-to-multipoint (PTM) transmission or whether retransmitted, number of MBS hybrid automatic repeat and request (HARQ) processes, and MBS HARQ process ID offset information.

MBS data may be received by the UE through PTP or PTM transmission through SPS.

For example, the identifier used to indicate whether semi-persistent scheduling for point-to-multipoint (PTM) transmission is activated or whether retransmitted may be a parameter distinguished from the identifier used to indicate whether semi-persistent scheduling for point-to-point (PTP) transmission is activated or whether retransmitted.

Or, the number of MBS HARQ processes included in the configuration information may be a parameter distinguished from the number of HARQ processes for downlink semi-persistent scheduling. The information on the number of HARQ processes used for the UE to receive unicast data through the SPS and the number of MBS HARQ processes included in the above-described configuration information may be different parameters.

Or, the HARQ process ID offset may be a parameter distinguished from the HARQ offset for downlink semi-persistent scheduling. The HARQ process ID offset information used for the UE to receive unicast data through the SPS and the HARQ process ID offset information included in the above-described configuration information may be different parameters.

The UE may perform the step of monitoring indication information associated with semi-persistent scheduling based on the configuration information (S820).

For example, the UE may configure/set the configuration information in the UE when the configuration information is received. The UE monitors whether indication information associated with semi-persistent scheduling is received based on the parameter included in the configuration information.

The indication information associated with semi-persistent scheduling may include at least one of information indicating activation of semi-persistent scheduling for MBS data configured in the UE, information indicating deactivation, and information indicating retransmission.

For example, the indication information may be indicated (e.g., provided, transmitted) to the UE through the group common PDCCH. In this case, the identifier for indicating whether to activate the SPS for MBS data may be allocated separately to be distinguished from the group common PDCCH used for dynamic resource allocation. In other words, to distinguish between dynamic resource scheduling and semi-persistent scheduling, each group common PDCCH may be scrambled with a different identifier. Accordingly, the UE may monitor the indication information about whether to activate the SPS for the MBS data through the group common PDCCH.

Similarly, the indication information may be indicated (e.g., provided, transmitted) to the UE through a UE-specific PDCCH. The identifier for indicating whether to activate SPS for MBS data may be separately allocated to be distinguished from the UE-specific PDCCH used for dynamic resource allocation. In other words, to distinguish between dynamic resource scheduling and semi-persistent scheduling, each UE-specific PDCCH may be scrambled with a different identifier. Accordingly, the UE may monitor the indication information about whether to activate the SPS for the MBS data through the UE-specific PDCCH.

As such, the UE may monitor the deactivation indication of semi-persistent scheduling through the group common PDCCH identified through the identifier used to indicate whether to activate semi-persistent scheduling for point-to-multipoint (PTM) transmission or whether retransmitted.

Or, the UE may monitor the deactivation indication of semi-persistent scheduling through the UE-specific PDCCH identified through the identifier used to indicate whether to activate semi-persistent scheduling for point-to-point (PTP) transmission or whether retransmitted.

The UE may perform the step of receiving MBS data according to semi-persistent scheduling based on the configuration information (S830).

For example, if semi-persistent scheduling is activated, the UE may receive MBS data using the configuration information associated with the corresponding scheduling. The HARQ process of receiving MBS data through semi-persistent scheduling, slot number, and other radio resources are described below in greater detail through individual embodiments.

By the above-described operations, the UE may more effectively receive data by applying SPS in receiving MBS data. Further, the UE may efficiently receive MBS data dynamically using the PTO and PTM transmission schemes.

Base station operations for controlling the above-described UE operations are described below with reference to the drawings.

Figure 9:
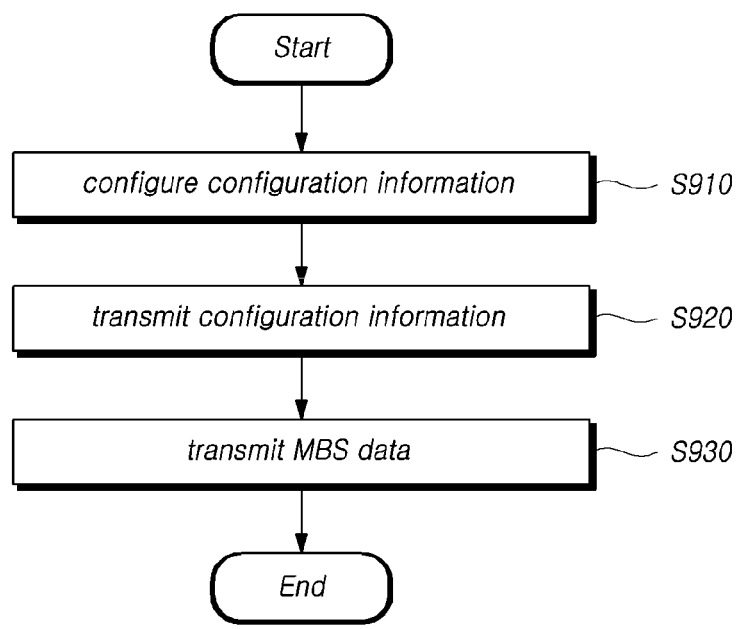
FIG. 9 is a flowchart for describing operations of a base station according to an embodiment.

FIG. 9 is a flowchart for describing operations of a base station according to an embodiment.

Referring to FIG. 9, a base station transmitting multicast/broadcast service (MBS) data may perform the step of configuring configuration information to transmit multicast/broadcast service (MBS) data to the UE through semi-persistent scheduling (SPS) (S910).

For example, the base station may configure configuration information for transmitting MBS data transmitted in a broadcast, groupcast or unicast form. The configuration information may include information necessary for the UE to receive MBS data through semi-persistent scheduling.

According to an embodiment, the configuration information may include at least one information of an identifier used to indicate whether semi-persistent scheduling is activated for the point-to-multipoint (PTM) transmission or whether retransmitted, number of MBS hybrid automatic repeat and request (HARQ) processes, and MBS HARQ process ID offset information.

For example, the identifier used to indicate whether semi-persistent scheduling for point-to-multipoint (PTM)

transmission is activated or whether retransmitted may be a parameter distinguished from the identifier used to indicate whether semi-persistent scheduling for point-to-point (PTP) transmission is activated or whether retransmitted.

Or, the number of MBS HARQ processes included in the configuration information may be a parameter distinguished from the number of HARQ processes for downlink semi-persistent scheduling. The information on the number of HARQ processes used for the UE to receive unicast data through the SPS and the number of MBS HARQ processes included in the above-described configuration information may be different parameters.

Or, the HARQ process ID offset may be a parameter distinguished from the HARQ offset for downlink semi-persistent scheduling. The HARQ process ID offset information used for the UE to receive unicast data through the SPS and the HARQ process ID offset information included in the above-described configuration information may be different parameters.

The base station may perform the step of transmitting the configuration information to the UE through higher layer signaling (S920).

For example, the configuration information may be transmitted to the UE through an RRC message. The base station may transmit the configuration information before transmitting MBS data to the UE. The base station may transmit configuration information for general MBS data transmission and configuration information for MBS data transmission through the SPS, as one configuration information, to the UE. Or, the base station may separate the configuration information for general MBS data transmission and the configuration information for MBS data transmission through the SPS from each other, and transmit them to the UE.

Meanwhile, the UE may configure/set the configuration information in the UE when the configuration information is received. The base station may transmit, to the UE, indication information associated with semi-persistent scheduling based on the parameter included in the configuration information.

The indication information associated with semi-persistent scheduling may include at least one of information indicating activation of semi-persistent scheduling for MBS data configured in the UE, information indicating deactivation, and information indicating retransmission.

For example, the indication information may be indicated to the UE through the group common PDCCH. In this case, the identifier for indicating whether to activate the SPS for MBS data may be allocated separately to be distinguished from the group common PDCCH used for dynamic resource allocation. In other words, to distinguish between dynamic resource scheduling and semi-persistent scheduling, each group common PDCCH may be scrambled with a different identifier. Accordingly, the UE may monitor the indication information about whether to activate the SPS for the MBS data through the group common PDCCH.

Similarly, the indication information may be indicated to the UE through a UE-specific PDCCH. The identifier for indicating whether to activate SPS for MBS data may be separately allocated to be distinguished from the UE-specific PDCCH used for dynamic resource allocation. In other words, to distinguish between dynamic resource scheduling and semi-persistent scheduling, each UE-specific PDCCH may be scrambled with a different identifier. Accordingly, the UE may monitor the indication information about whether to activate the SPS for the MBS data through the UE-specific PDCCH.

As such, the base station may transfer the deactivation indication of semi-persistent scheduling through the group common PDCCH identified through the identifier used to indicate whether to activate semi-persistent scheduling for point-to-multipoint (PTM) transmission or whether retransmitted.

Or, the base station may transfer the deactivation indication of semi-persistent scheduling through the UE-specific PDCCH identified through the identifier used to indicate whether to activate semi-persistent scheduling for point-to-point (PTP) transmission or whether retransmitted.

The base station may perform the step of transmitting MBS data according to semi-persistent scheduling based on the configuration information (S930).

For example, if semi-persistent scheduling is activated, the base station may transmit MBS data using the configuration information associated with the corresponding scheduling. The HARQ process of receiving MBS data through semi-persistent scheduling, slot number, and other radio resources are described below in greater detail through individual embodiments.

By the above-described operations, the base station may effectively control the MBS data reception operation using the UE's SPS. Further, the base station may efficiently transmit MBS data using semi-persistent scheduling operation along with PTP and PTM transmission schemes.

Hereinafter, various embodiments will be described in detail. The embodiments described below may be performed independently or in any combination with the above-described UE and base station operations. In the disclosure, the MBS data transmission is used in the same meaning as PTM transmission or group common PDSCH transmission, if necessary. Accordingly, the terms may be interchanged.

Method of Indicating SPS Activation/Deactivation Through UE Specific PDCCH When Failing to Receive ACK for SPS Activation/Deactivation Indication Through Group Common PDCCH The UE may establish an MBS session for a specific multicast group in the RRC connection state, configure a corresponding MBS radio bearer, and receive MBS data.

Figure 10:
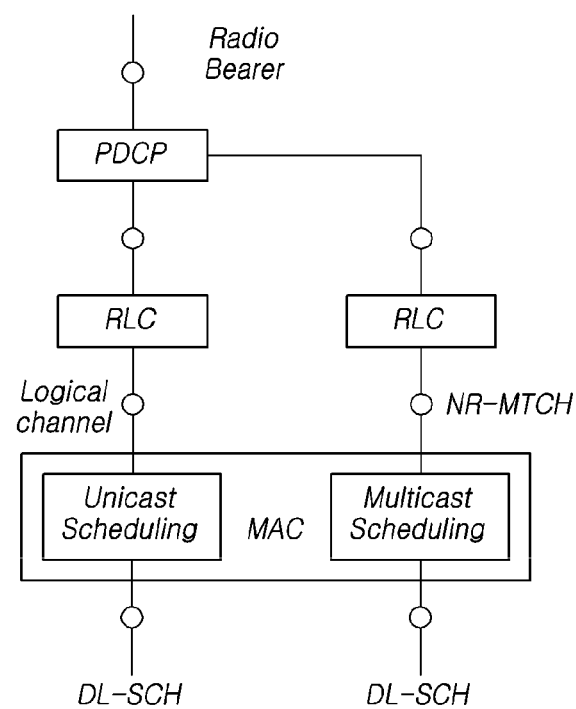
FIG. 10 is a view illustrating an exemplary layer 2 structure for receiving MBS data.

FIG. 10 is a view illustrating an example of a layer 2 structure for receiving MBS data.

Referring to FIG. 10, for an MBS service session belonging to one multicast group, the MBS radio bearer may be defined as a separate bearer structure having two legs/paths. One leg/path of the MBS radio bearer based on the separate bearer structure may include L2 entity(ies) configuration for (normal) unicast DRB for PTP transmission and perform PTP transmission. The other leg/path may include L2 entity (ies) configuration for PTM transmission and perform PTM transmission.

The RLC entity of unicast leg/path for PTP transmission may be configured in association with the logical channel identifier. Data may be received by scheduling indicated by the C-RNTI in the MAC. The RLC entity of the leg/path for PTM transmission may be distinguished per MBS session and be configured in association with the RNTI for identifying data reception or MBS session data transmission. Here, for convenience of description, MBS user data is denoted as NR-MTCH, but this is only for convenience of description. MBS user data may be replaced with any other terms (e.g., MB Traffic Channel, Multicast Traffic Channel). Further, the RNTI for MBS data identification means a multicast session/multicast group specific RNTI or a group common RNTI for multicast traffic/data, similar to SC-RNTI and G-RNTI. Here, for convenience of description, it is denoted as MBS-G-RNTI. This is only for ease of description, and it may be replaced with another term.

The RLC entity of the unicast leg/path for PTP transmission and the RLC entity of the leg/path for PTM transmission may be associated with one PDCP entity. The PDCP entity may be associated with an MBS service session (TMGI/MBS session ID/IP multicast address). The UE may receive MBS service data transmitted according to the transmission scheme selected by the base station. For example, the base station may transmit data through one path (or two paths) of the RLC entity of the unicast leg/path for PTP transmission and the RLC entity of the leg/path for PTM transmission in the PDCP entity and the UE may receive the data.

The base station is aware of one set of UEs having joined the corresponding multicast group. For example, in the structure as shown in FIG. 10, there may be as many RLC entities of the leg/path for PTM transmission as the number of RRC connected UEs having joined the corresponding multicast group.

Meanwhile, semi-persistent scheduling (SPS) may be provided for the MBS. For example, one or more SPS group common PDSCHs may be configured considering different MBS traffic for the RRC connected UE. The SPS group common PDSCH may be scrambled/addressed by the above-described MBS-G-RNTI.

The base station (MAC entity of the base station) may indicate SPS activation/deactivation for the group common PDSCH through the group common PDCCH, on the leg/path for PTM transmission or the MBS radio bearer. The RRC may define/indicate a period in which SPS (configured downlink assignment) is implicitly reused. A specific RNTI may be configured in the UE by the base station to distinguish the group common PDCCH for indicating SPS activation/deactivation for MBS data (for PTM transmission/for group common PDSCH) from the group common PDCCH for dynamic resource allocation. For convenience of description, the corresponding RNTI is denoted as MBS-CS-RNTI. This is only for ease of description, and it may be replaced with another term.

According to an embodiment, CS-RNTI used to scramble/address PDCCH for SPS activation/deactivation for PTP transmission may be used as MBS-CS-RNTI. Thus, RNTI resources may be saved. According to another embodiment, an RNTI distinguished from the CS-RNTI may be used as the MBS-CS-RNTI. Thus, the UE may decode data in a designated search space.

If the group common PDCCH scrambled with MBS-CS-RNTI indicates SPS activation, the UE may store HARQ information associated with downlink assignment for this serving cell as configured downlink assignment. The HARQ information may include one or more pieces of information of new data indicator (NDI), transport block size (TBS), redundancy version (RV), and HARQ process ID. The UE may start/restart the configured downlink assignment in the group common PDSCH duration associated with this serving cell.

If the configured downlink assignment does not overlap the PDSCH duration of the downlink assignment received in this serving cell, the UE (MAC entity of the UE) instructs the physical layer to receive the transport block on the DL-SCH according to the configured downlink assignment in this PDSCH duration. The UE controls to transfer this to the HARQ entity.

The UE sets the HARQ process ID to the HARQ process ID associated with the PDSCH duration. It indicates the presence of the configured downlink assignment. The stored HARQ information is transferred to the HARQ entity.

Since data may be received in the configured period if the SPS is activated, the UE should be able to transfer the feedback for SPS activation/deactivation indication reception to the base station. The UE may receive a PUCCH resource for HARQ feedback (ACK/NACK) for the group common PDCCH (SPS activation/deactivation indication for group common PDSCH through the group common PDCCH) through a dedicated RRC message (e.g., RRC reconfiguration message). The corresponding PUCCH resource may be UE-specifically configured.

If failing to receive feedback for SPS activation/deactivation through the group common PDCCH from a specific UE (or if receiving a NACK), the base station may reindicate the SPS activation/deactivation for the corresponding UE.

According to an embodiment, the base station (e.g., MAC entity of the base station) may reindicate SPS activation/deactivation for the group common PDSCH through the UE-specific PDCCH, on the leg/path for PTM transmission or the MBS radio bearer. According to another embodiment, after any other UE joins the corresponding multicast group and receives a radio resource configuration for receiving MBS data while data is transmitted through SPS for the UEs belonging to the corresponding multicast group, the base station may indicate SPS activation for the group common PDSCH through the UE-specific PDCCH to the corresponding UE. According to still another embodiment, when any UE belonging to the corresponding multicast group desires to be released from the corresponding multicast group (or does not want to receive data) while data is transmitted through SPS for the UEs belonging to the corresponding multicast group, the base station may indicate SPS deactivation for the group common PDSCH through the UE-specific PDCCH to the corresponding UE. The UE may receive a PUCCH resource for HARQ feedback (ACK/NACK) for the UE-specific PDCCH (SPS activation/deactivation indication for group common PDSCH through the UE-specific PDCCH) through a dedicated RRC message (e.g., RRC reconfiguration message). The corresponding PUCCH resource may be UE-specifically configured.

A specific RNTI may be configured in the UE by the base station to distinguish the UE-specific PDCCH for indicating SPS activation/deactivation for MBS data (for PTM transmission/for group common PDSCH) from the PDCCH for dynamic resource allocation. For convenience of description, the RNTI is denoted as MBS-UE-CS-RNTI. This is only for ease of description, and it may be replaced with another term.

CS-RNTI used to scramble/address PDCCH for SPS activation/deactivation for PTP transmission may be used as MBS-UE-CS-RNTI. According to another embodiment, an RNTI distinguished from the CS-RNTI may be used as the MBS-UE-CS-RNTI. For example, MBS-CS-RNTI used to scramble/address PDCCH for SPS activation/deactivation for PTM transmission may be used as MBS-UE-CS-RNTI. Or, an RNTI distinguished from the MBS-CS-RNTI may be used as the MBS-UE-CS-RNTI.

If the UE-specific PDCCH scrambled with MBS-UE-CS-RNTI indicates SPS activation, the UE may store HARQ information associated with downlink assignment for this serving cell as configured downlink assignment. The HARQ information may include one or more pieces of information of new data indicator (NDI), transport block size (TBS), redundancy version (RV), and HARQ process ID. The UE may start/restart the configured downlink assignment in the group common PDSCH duration associated with this serving cell.

If the configured downlink assignment does not overlap the PDSCH duration of the downlink assignment received in this serving cell, the UE (MAC entity of the UE) instructs the physical layer to receive the transport block on the DL-SCH according to the configured downlink assignment in this PDSCH duration. It is transferred to the HARQ entity.

The UE sets the HARQ process ID to the HARQ process ID associated with the PDSCH duration. The UE indicates the presence of the configured downlink assignment. The UE transfers the stored HARQ information to the HARQ entity.

Method for Distinguishing Between HARQ Process ID for PTM Transmission and HARQ Process ID for PTP Transmission and Using Them Process ID for PTP Transmission and Using Them The SPS configuration for one group common PDSCH may be configured in association with the MBS service. Thus, the base station may effectively transmit and receive MBS data using an SPS configuration suitable for the corresponding MBS service. When adding and using the SPS configuration for MBS data transmission, it is preferable to control the total number of SPS configurations supported by the UE not to exceed the total number of SPS configurations supported by the UE that does not support the SPS configuration for MBS data transmission. For example, SPS configuration for MBS data transmission and SPS configuration for normal (unicast) data transmission may use up to 8 SPS configurations per BWP.

In the case of dynamic scheduling, the HARQ process ID is indicated on the corresponding DCI format, whereas in the case of SPS, there is no PDCCH for the corresponding PDSCH. Therefore, the HARQ process ID needs to be calculated based on the current slot (CURRENT_slot), the number of slots per frame (numberOfSlotsPerFrame), SPS cycle (periodicity) and the number of HARQ processes (nrofHARQ-Processes).

For example, the UE may be configured with up to N (e.g., 16) HARQ processes. The HARQ process for MBS data transmission (or PTM transmission or group common PDSCH transmission) may be used separately from the existing HARQ process. Thus, one UE may effectively process PTM transmission and PTP transmission.

For example, an additional HARQ process for MBS data transmission (or PTM transmission or group common PDSCH transmission) may be defined. For convenience of description, the maximum number of HARQ processes for MBS data transmission (or PTM transmission or group common PDSCH transmission) is described as 4. This is merely for convenience of description. For example, the maximum number of HARQ processes for MDS data transmission may be any natural number between 1 and N (where N is a natural number of 2 or more) according to embodiments. The ID of the additional HARQ process for MBS data transmission (or PTM transmission or group common PDSCH transmission) may have one value among 0, 1, 2, and 3.

For the configured downlink assignment for MBS data transmission (or PTM transmission or group common PDSCH transmission), if the MBS HARQ process ID offset (mbs-harq-ProcID-Offset) is not used, the HARQ process ID associated with the slot where the downlink transmission starts may be derived through the following equation.

$$\text{HARQ Process ID} = [\text{floor}(\text{CURRENT\_slot} \times 10 / (\text{numberOfSlotsPerFrame} \times \text{periodicity}))] \text{ modulo mbs-nrofHARQ-Processes}$$

where CURRENT_slot=[(SFN×numberOfSlotsPerFrame)+ slot number in the frame] and numberOfSlotsPerFrame refers to the number of consecutive slots per frame.

For the configured downlink assignment for MBS data transmission (or PTM transmission or group common PDSCH transmission), if the MBS HARQ process ID offset (mbs-harq-ProcID-Offset) is used, the HARQ process ID associated with the slot where the downlink transmission starts may be derived through the following equation.

$$\text{HARQ Process ID} = [\text{floor}(\text{CURRENT\_slot} \times 10 / (\text{numberOfSlotsPerFrame} \times \text{periodicity}))] \text{ modulo mbs-nrofHARQ-Processes} + \text{MBS+harq-ProcID-Offset}$$

where CURRENT_slot=[(SFN×numberOfSlotsPerFrame)+ slot number in the frame] and numberOfSlotsPerFrame.

Here, MBS HARQ process ID offset (mbs-harq-ProcID-Offset) denotes the offset used to derive the HARQ process ID for MBS data transmission. mbs-nrofHARQ-Processes denotes the number of configured HARQ processes for SPS for MBS data transmission.

If the maximum number of HARQ processes for MBS data transmission (or PTM transmission or group common PDSCH transmission) is 4 and if the maximum number of HARQ processes is 16, the maximum number of HARQ processes for normal (unicast) data transmission may be 16, as typically. As another example, the maximum number of HARQ processes for normal (unicast) data transmission may be 12 to maintain the total maximum HARQ processes as 16.

For the configured downlink assignment for normal data transmission (or PTP transmission or UE-specific PDSCH transmission), if the HARQ process ID offset (harq-ProcID-Offset) is not used, the HARQ process ID associated with the slot where the downlink transmission starts may be derived through the following equation.

$$\text{HARQ Process ID} = [\text{floor}(\text{CURRENT\_slot} \times 10 / (\text{numberOfSlotsPerFrame} \times \text{periodicity}))] \text{ modulo nrof-HARQ-Processes}$$

where CURRENT_slot=[(SFN×numberOfSlotsPerFrame)+ slot number in the frame] and numberOfSlotsPerFrame refers to the number of consecutive slots per frame.

For the configured downlink assignment for normal data transmission (or PTP transmission or UE-specific PDSCH transmission), if the HARQ process ID offset (harq-ProcID-Offset) is used, the HARQ process ID associated with the slot where the downlink transmission starts may be derived through the following equation.

$$\text{HARQ Process ID} = [\text{floor}(\text{CURRENT\_slot} \times 10 / (\text{numberOfSlotsPerFrame} \times \text{periodicity}))] \text{ modulo nrof-HARQ-Processes} + \text{harq-ProcID-Offset}$$

where CURRENT_slot=[(SFN×numberOfSlotsPerFrame)+ slot number in the frame] and numberOfSlotsPerFrame.

Here, HARQ process ID offset (harq-ProcID-Offset) denotes the offset used to derive the HARQ process ID for normal data transmission. nrofHARQ-Processes denotes the number of configured HARQ processes for SPS for normal data transmission.

MBS HARQ process ID offset (mbs-harq-ProcID-Offset) may be defined as a value distinct from the HARQ process ID offset (mbs-harq-ProcID-Offset) for normal data transmission.

Or, the number of configured HARQ processes for SPS for MBS data transmission may be defined as a value distinct from the number of configured HARQ processes for SPS for normal data transmission.

As another example, some of the existing HARQ processes may be used for MBS data transmission (or PTM transmission or group common PDSCH transmission). For example, first, intermediate, or last consecutive assigned IDs of the IDs of the HARQ processes for MBS data transmission (or PTM transmission or group common PDSCH transmission) may be used.

According to an embodiment, the ID of the HARQ process for MBS data transmission (or PTM transmission or group common PDSCH transmission) may have one value among 0, 1, 2, and 3. The ID of the HARQ process for typical normal data (e.g., unicast) transmission, not MBS data transmission (or PTM transmission or group common PDSCH transmission), may have a value among 4 to 13. According to another embodiment, the ID of the HARQ process for MBS data transmission (or PTM transmission or group common PDSCH transmission) may have one value among 12, 13, 14, and 15. The ID of the HARQ process for typical normal data transmission, not MBS data transmission (or PTM transmission or group common PDSCH transmission), may have one value among 0 to 11. According to still another embodiment, the ID of the HARQ process for MBS data transmission (or PTM transmission or group common PDSCH transmission) may have any four consecutive values among 0 to 15. The ID of the HARQ process for typical normal data transmission, not MBS data transmission (or PTM transmission or group common PDSCH transmission), may have one of the remaining values.

For the configured downlink assignment for MBS data transmission (or PTM transmission or group common PDSCH transmission), the base station may define an offset information element to calculate the HARQ process ID for MBS data transmission and may configure it in the UE through RRC. For convenience of description, the corresponding offset information element is denoted as MBS-harq-ProcID-Offset. This is only for ease of description, and it may be replaced with another term.

For the configured downlink assignment for MBS data transmission (or PTM transmission or group common PDSCH transmission), if the HARQ process ID offset (harq-ProcID-Offset) is not used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes+MBS-harq-ProcID-Offset where CURRENT_slot=[(SFN×numberOfSlotsPerFrame)+slot number in the frame] and numberOfSlotsPerFrame refers to the number of consecutive slots per frame.

For the configured downlink assignment for MBS data transmission (or PTM transmission or group common PDSCH transmission), if the HARQ process ID offset (harq-ProcID-Offset) is used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes+harq-ProcID-Offset+MBS-harq-ProcID-Offset where CURRENT_slot=[(SFN×numberOfSlotsPerFrame)+slot number in the frame] and numberOfSlotsPerFrame.

Method for Sharing HARQ Process ID for PTM Transmission and HARQ Process ID for PTP Transmission The UE may be configured with up to N (e.g., 16) HARQ processes. In the following description, N is assumed to be 16, as an example, but N may be a natural number not smaller than 2. The MBS data may be transmitted using the existing HARQ process without separately defining an HARQ process for MBS data transmission (or PTM transmission or group common PDSCH transmission). The existing 16 HARQ processes may be shared and used for MBS data transmission (or PTM transmission or group common PDSCH transmission) and conventional data transmission other than MBS data transmission. Thus, flexible scheduling is possible.

For example, the ID of the HARQ process for MBS data transmission may have one value among 0 to 15. The ID of the HARQ process for conventional normal data transmission, not MBS data transmission (or PTM transmission or group common PDSCH transmission), may have one value among 0 to 15.

According to an embodiment, for the configured downlink assignment for MBS data transmission (or PTM transmission or group common PDSCH transmission), if the MBS HARQ process ID offset (mbs-harq-ProcID-Offset) is not used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes where CURRENT_slot=[(SFN×numberOfSlotsPerFrame)+slot number in the frame] and numberOfSlotsPerFrame refers to the number of consecutive slots per frame.

For the configured downlink assignment for MBS data transmission (or PTM transmission or group common PDSCH transmission), if the mbs-HARQ process ID offset (harq-ProcID-Offset) is used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes+mbs-harq-ProcID-Offset where CURRENT_slot=[(SFN×numberOfSlotsPerFrame)+slot number in the frame] and numberOfSlotsPerFrame.

Here, MBS HARQ process ID offset (mbs-harq-ProcID-Offset) denotes the offset used to derive the HARQ process ID for MBS data transmission. nrofHARQ-Processes denotes the number of configured HARQ processes for SPS for all data transmissions (MBS data transmission+normal data transmission).

According to another embodiment, for the configured downlink assignment for MBS data transmission (or PTM transmission or group common PDSCH transmission), if the HARQ process ID offset (harq-ProcID-Offset) is not used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes+mbs-harq-ProcID-Offset where CURRENT_slot=[(SFN×numberOfSlotsPerFrame)+slot number in the frame] and numberOfSlotsPerFrame refers to the number of consecutive slots per frame.

For the configured downlink assignment for MBS data transmission (or PTM transmission or group common PDSCH transmission), if the HARQ process ID offset (harq-ProcID-Offset) is used, the HARQ process ID associated with the slot where the downlink transmission starts may be derived through the following equation.

HARQ Process ID=[floor(CURRENT_slot×10/(numberOfSlotsPerFrame×periodicity))]modulo nrof-HARQ-Processes+harq-ProcID-Offset+mbs-harq-ProcID-Offset where CURRENT_slot=[(SFN×numberOfSlotsPerFrame)+slot number in the frame] and numberOfSlotsPerFrame.

Thus, the offsets of MBS data and general data may be distinguished and configured, and collision may be prevented.

According to still another embodiment, for the configured downlink assignment for MBS data transmission (or PTM transmission or group common PDSCH transmission), if the HARQ process ID offset (harq-ProcID-Offset) is not used, the HARQ process ID associated with the slot where the downlink transmission starts may be derived through the following equation.

HARQ Process ID=[floor(CURRENT_slot×10/(numberOfSlotsPerFrame×periodicity))]modulo mbs-nrofHARQ-Processes+mbs-harq-ProcID-Offset where CURRENT_slot=[(SFN×numberOfSlotsPerFrame)+slot number in the frame] and numberOfSlotsPerFrame refers to the number of consecutive slots per frame.

For the configured downlink assignment for MBS data transmission (or PTM transmission or group common PDSCH transmission), if the HARQ process ID offset (harq-ProcID-Offset) is used, the HARQ process ID associated with the slot where the downlink transmission starts may be derived through the following equation.

HARQ Process ID=[floor(CURRENT_slot×10/(numberOfSlotsPerFrame×periodicity))]modulo mbs-nrofHARQ-Processes+harq-ProcID-Offset+mbs-harq-ProcID-Offset where CURRENT_slot=[(SFN×numberOfSlotsPerFrame)+slot number in the frame] and numberOfSlotsPerFrame.

Here, mbs-nrofHARQ-Processes denotes the number of configured HARQ processes for SPS for MBS data transmission.

According to the above-described operations, the UE may more effectively receive data by applying SPS in receiving MBS data. Further, the UE may efficiently receive MBS data dynamically using the PTO and PTM transmission schemes. In addition, it is possible to effectively receive MBS service data without dynamic resource allocation in the NR wireless network. Any parameter described above in connection with the foregoing embodiments may be indicated and configured to the UE through an RRC message by the base station.

Hereinafter, hardware and software configurations of a UE and a base station capable of performing the above-described embodiments will be described with reference to the accompanying drawings.

Figure 11:
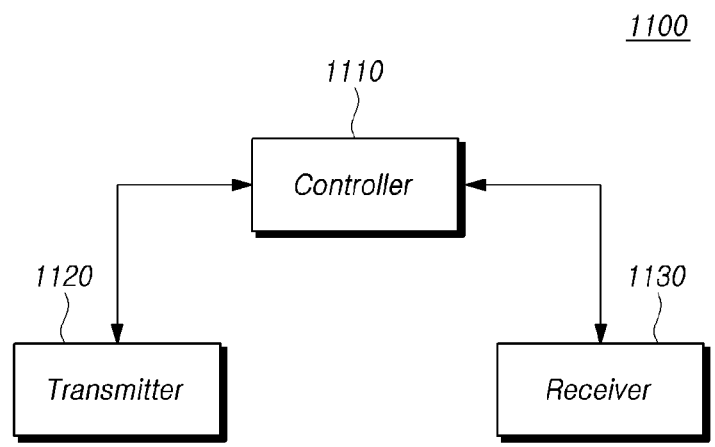
FIG. 11 is a block diagram illustrating a UE according to an embodiment.

FIG. 11 is a block diagram illustrating a UE according to an embodiment.

Referring to FIG. 11, a UE 1100 receiving multicast/broadcast service (MBS) data includes a receiver 1130 for receiving configuration information to receive multicast/broadcast service (MBS) data through semi-persistent scheduling (SPS) and a controller 1110 for monitoring indication information associated with semi-persistent scheduling based on the configuration information. The receiver 1130 receives MBS data according to semi-persistent scheduling based on the configuration information.

For example, the receiver 1130 may receive configuration information for receiving MBS data transmitted in a broadcast, groupcast or unicast form from the base station. The configuration information may include information necessary for the UE 1100 to receive MBS data through semi-persistent scheduling. The configuration information may be received through higher layer signaling. For example, the configuration information may be received through an RRC message.

According to an embodiment, the configuration information may include at least one information of an identifier used to indicate whether semi-persistent scheduling is activated for the point-to-multipoint (PTM) transmission or whether retransmitted, number of MBS hybrid automatic repeat and request (HARQ) processes, and MBS HARQ process ID offset information.

The identifier used to indicate whether semi-persistent scheduling for point-to-multipoint (PTM) transmission is activated or whether retransmitted may be a parameter distinguished from the identifier used to indicate whether semi-persistent scheduling for point-to-point (PTP) transmission is activated or whether retransmitted.

Or, the number of MBS HARQ processes included in the configuration information may be a parameter distinguished from the number of HARQ processes for downlink semi-persistent scheduling. The information on the number of HARQ processes used for the UE 1100 to receive unicast data through the SPS and the number of MBS HARQ processes included in the above-described configuration information may be different parameters.

Or, the HARQ process ID offset may be a parameter distinguished from the HARQ offset for downlink semi-persistent scheduling. The HARQ process ID offset information used for the UE 1100 to receive unicast data through the SPS and the HARQ process ID offset information included in the above-described configuration information may be different parameters.

The controller 1110 may configure/set the configuration information in the UE when the configuration information is received. The controller 1110 monitors whether indication information associated with semi-persistent scheduling is received based on the parameter included in the configuration information.

The indication information associated with semi-persistent scheduling may include at least one of i) information indicating activation of semi-persistent scheduling for MBS data configured in the UE 1100, ii) information indicating deactivation, and iii) information indicating retransmission.

For example, the indication information may be indicated to the UE 1100 through the group common PDCCH. In this case, the identifier for indicating whether to activate the SPS for MBS data may be allocated separately to be distinguished from the group common PDCCH used for dynamic resource allocation. In other words, to distinguish between dynamic resource scheduling and semi-persistent scheduling, each group common PDCCH may be scrambled with a different identifier. Accordingly, the controller 1110 may monitor the indication information about whether to activate the SPS for the MBS data through the group common PDCCH.

Similarly, the indication information may be indicated to the UE through a UE-specific PDCCH. The identifier for indicating whether to activate SPS for MBS data may be separately allocated to be distinguished from the UE-specific PDCCH used for dynamic resource allocation. In other words, to distinguish between dynamic resource scheduling and semi-persistent scheduling, each UE-specific PDCCH may be scrambled with a different identifier. Accordingly, the controller 1110 may monitor the indication information about whether to activate the SPS for the MBS data through the UE-specific PDCCH.

As such, the controller 1110 may monitor the deactivation indication of semi-persistent scheduling through the group common PDCCH identified through the identifier used to indicate whether to activate semi-persistent scheduling for point-to-multipoint (PTM) transmission or whether retransmitted. Or, the controller 1110 may monitor the deactivation indication of semi-persistent scheduling through the UE-specific PDCCH identified through the identifier used to indicate whether to activate semi-persistent scheduling for point-to-point (PTP) transmission or whether retransmitted.

If semi-persistent scheduling is activated, the receiver 1130 may receive MBS data using the configuration information associated with the corresponding scheduling.

The controller 1110 controls the overall operation of the UE 1100 according to the MBS data reception method depending on whether to activate SPS necessary to perform the above-described embodiments.

The transmitter 1120 and the receiver 1130 are used to transmit or receive signals or messages or data necessary for performing the above-described embodiments, with the base station.

Figure 12:
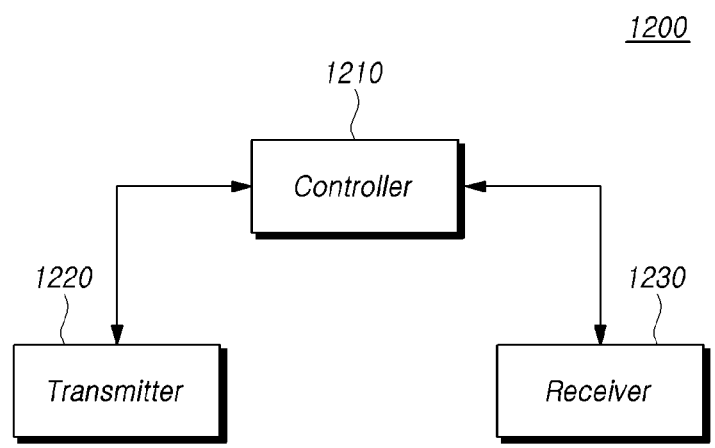
FIG. 12 is a block diagram illustrating a base station according to an embodiment.

FIG. 12 is a block diagram illustrating a base station according to an embodiment.

Referring to FIG. 12, a base station 1200 transmitting multicast/broadcast service (MBS) data includes a controller 1210 for configuring configuration information to transmit multicast/broadcast service (MBS) data through semi-persistent scheduling (SPS) to a UE and a transmitter 1220 for transmitting the configuration information to the UE through higher layer signaling and transmitting MBS data according to semi-persistent scheduling based on the configuration information.

For example, the controller 1210 may configure configuration information for transmitting MBS data transmitted in a broadcast, groupcast or unicast form. The configuration information may include information necessary for the UE to receive MBS data through semi-persistent scheduling.

According to an embodiment, the configuration information may include at least one information of an identifier used to indicate whether semi-persistent scheduling is activated for the point-to-multipoint (PTM) transmission or whether retransmitted, number of MBS hybrid automatic repeat and request (HARQ) processes, and MBS HARQ process ID offset information.

For example, the identifier used to indicate whether semi-persistent scheduling for point-to-multipoint (PTM) transmission is activated or whether retransmitted may be a parameter distinguished from the identifier used to indicate whether semi-persistent scheduling for point-to-point (PTP) transmission is activated or whether retransmitted.

Or, the number of MBS HARQ processes included in the configuration information may be a parameter distinguished from the number of HARQ processes for downlink semi-persistent scheduling. The information on the number of HARQ processes used for the UE to receive unicast data through the SPS and the number of MBS HARQ processes included in the above-described configuration information may be different parameters.

Or, the HARQ process ID offset may be a parameter distinguished from the HARQ offset for downlink semi-persistent scheduling. The HARQ process ID offset information used for the UE to receive unicast data through the SPS and the HARQ process ID offset information included in the above-described configuration information may be different parameters.

For example, the configuration information may be transmitted to the UE through an RRC message. The transmitter 1220 may transmit the configuration information before transmitting MBS data to the UE. The transmitter 1220 may transmit configuration information for general MBS data transmission and configuration information for MBS data transmission through the SPS, as one configuration information, to the UE. Or, the transmitter 1220 may separate the configuration information for general MBS data transmission and the configuration information for MBS data transmission through the SPS from each other, and transmit them to the UE.

Meanwhile, the UE may configure/set the configuration information in the UE when the configuration information is received. The transmitter 1220 may transmit, to the UE, indication information associated with semi-persistent scheduling based on the parameter included in the configuration information.

The indication information associated with semi-persistent scheduling may include at least one of i) information indicating activation of semi-persistent scheduling for MBS data configured in the UE, ii) information indicating deactivation, and iii) information indicating retransmission.

For example, the indication information may be indicated to the UE through the group common PDCCH. In this case, the identifier for indicating whether to activate the SPS for MBS data may be allocated separately to be distinguished from the group common PDCCH used for dynamic resource allocation. In other words, to distinguish between dynamic resource scheduling and semi-persistent scheduling, each group common PDCCH may be scrambled with a different identifier. Accordingly, the UE may monitor the indication information about whether to activate the SPS for the MBS data through the group common PDCCH.

The indication information may be indicated to the UE through a UE-specific PDCCH. The identifier for indicating whether to activate SPS for MBS data may be separately allocated to be distinguished from the UE-specific PDCCH used for dynamic resource allocation. In other words, to distinguish between dynamic resource scheduling and semi-persistent scheduling, each UE-specific PDCCH may be scrambled with a different identifier. Accordingly, the UE may monitor the indication information about whether to activate the SPS for the MBS data through the UE-specific PDCCH.

As such, the base station 1200 may transfer the deactivation indication of semi-persistent scheduling through the group common PDCCH identified through the identifier used to indicate whether to activate semi-persistent scheduling for point-to-multipoint (PTM) transmission or whether retransmitted.

Or, the base station 1200 may transfer the deactivation indication of semi-persistent scheduling through the UE-specific PDCCH identified through the identifier used to indicate whether to activate semi-persistent scheduling for point-to-point (PTP) transmission or whether retransmitted.

The controller 1210 controls the overall operation of the base station 1200 according to the MBS data transmission method depending on whether to activate SPS necessary to perform the above-described embodiments.

The transmitter 1220 and the receiver 1230 are used to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for receiving multicast/broadcast service (MBS) data by a user equipment (UE), the method comprising:
   receiving configuration information, by the user equipment (UE), for receiving the MBS data through semi-persistent scheduling (SPS);
   receiving, by the user equipment (UE), indication information corresponding to the SPS based on the configuration information; and
   controlling, by the user equipment (UE), activation or deactivation of the SPS based on the indication information.

2. The method of claim 1, wherein the configuration information includes at least one of i) an identifier used to indicate whether to activate, deactivate, or retransmit the SPS for point-to-multipoint (PTM) transmission, ii) a number of MBS hybrid automatic repeat and request (HARQ) processes for MBS SPS, iii) MBS HARQ process ID offset information for the MBS SPS, and iv) periodicity information.

3. The method of claim 2, wherein the identifier is a parameter distinguished from an identifier used to indicate deactivation of SPS for point-to-point (PTP) transmission.

4. The method of claim 1, wherein the indication information is received through i) a group common physical downlink control channel (PDCCH) identified through an identifier used to indicate whether to activate, deactivate, or retransmit the SPS for PTM transmission or ii) a UE-specific PDCCH identified through an identifier used to indicate deactivation of the SPS for PTP transmission.

5. The method of claim 4, wherein the identifier used to indicate deactivation of the SPS for the PTP transmission is used for PTP transmission for the PTM retransmission.

6. The method of claim 2, wherein the number of the MBS HARQ processes is a parameter distinguished from a number of HARQ processes for downlink SPS.

7. The method of claim 2, wherein the HARQ process ID offset is a parameter distinguished from an HARQ offset for downlink SPS.

8. A method for transmitting multicast/broadcast service (MBS) data by a base station, the method comprising:
   configuring, by the base station, configuration information for transmitting the MBS data to a user equipment (UE) through semi-persistent scheduling (SPS);
   transmitting, by the base station, the configuration information to the UE through higher layer signaling; and
   transmitting, by the base station, indication information corresponding to the SPS to the UE based on the configuration information.

9. The method of claim 8, wherein the configuration information includes information about at least one of i) an identifier used to indicate whether to activate, deactivate, or retransmit the SPS for point-to-multipoint (PTM) transmission, ii) a number of MBS hybrid automatic repeat and request (HARQ) processes for MBS SPS, iii) MBS HARQ process ID offset information for the MBS SPS, and iv) periodicity information.

10. The method of claim 9, wherein the identifier is a parameter distinguished from an identifier used to indicate deactivation of SPS for point-to-point (PTP) transmission.

11. The method of claim 9, wherein the number of the MBS HARQ processes is a parameter distinguished from a number of HARQ processes for downlink SPS.

12. The method of claim 9, wherein the HARQ process ID offset is a parameter distinguished from an HARQ offset for downlink SPS.

13. A user equipment (UE) receiving multicast/broadcast service (MBS) data, the UE comprising:
   a receiver receiving configuration information for receiving the MBS data through semi-persistent scheduling (SPS) and receiving indication information corresponding to the SPS based on the configuration information; and
   a controller controlling activation or deactivation of the SPS based on the indication information.

14. The UE of claim 13, wherein the configuration information includes information about at least one of i) an identifier used to indicate whether to activate, deactivate, or retransmit the SPS for point-to-multipoint (PTM) transmission, ii) a number of MBS hybrid automatic repeat and request (HARQ) processes for MBS SPS, iii) MBS HARQ process ID offset information for the MBS SPS, and iv) periodicity information.

15. The UE of claim 14, wherein the identifier is a parameter distinguished from an identifier used to indicate deactivation of SPS for point-to-point (PTP) transmission.

16. The UE of claim 13, wherein the indication information is received through i) a group common PDCCH identified through an identifier used to indicate whether to activate, deactivate, or retransmit the SPS for PTM transmission or ii) a UE-specific PDCCH identified through an identifier used to indicate deactivation of the SPS for PTP transmission.

17. The UE of claim 16, wherein the identifier used to indicate deactivation of the SPS for the PTP transmission is used for PTP transmission for the PTM retransmission.

18. The UE of claim 14, wherein the number of the MBS HARQ processes is a parameter distinguished from a number of HARQ processes for downlink SPS.

19. The UE of claim 14, wherein the HARQ process ID offset is a parameter distinguished from an HARQ offset for downlink SPS.

* * * * *